March 22, 1932.      B. M. HYMAN      1,850,458

PICK-UP FOR HARVESTER THRESHERS

Filed Sept. 20, 1930

Inventor
Benjamin M. Hyman
By ... 
Atty.

Patented Mar. 22, 1932

1,850,458

UNITED STATES PATENT OFFICE

BENJAMIN M. HYMAN, OF CHICAGO, ILLINOIS, ASSIGNOR TO INTERNATIONAL HARVESTER COMPANY, A CORPORATION OF NEW JERSEY

PICK-UP FOR HARVESTER THRESHERS

Application filed September 20, 1930. Serial No. 483,157.

The invention relates to a pick-up attachment for use with harvester threshers or the like.

The objects of the invention are generally to improve the construction of such a pick-up, and particularly to improve the construction of a rotary cylinder type of pick-up.

Another object is to provide a yielding connection or cushion arrangement whereby, when the teeth on the cylinder rake bars encounter an overload or an obstruction, such as a stone lying in the field, the rake tooth bars may, individually or independently of each other, swing back automatically and temporarily in a yielding manner to relieve the pressure caused by such overload or obstruction, and in this manner prevent breakage.

Other objects will be apparent to those skilled in this art as the description continues.

In the accompanying sheet of drawings, an illustrative example of the invention has been chosen for purposes of illustration, and in these drawings.

Figure 1:
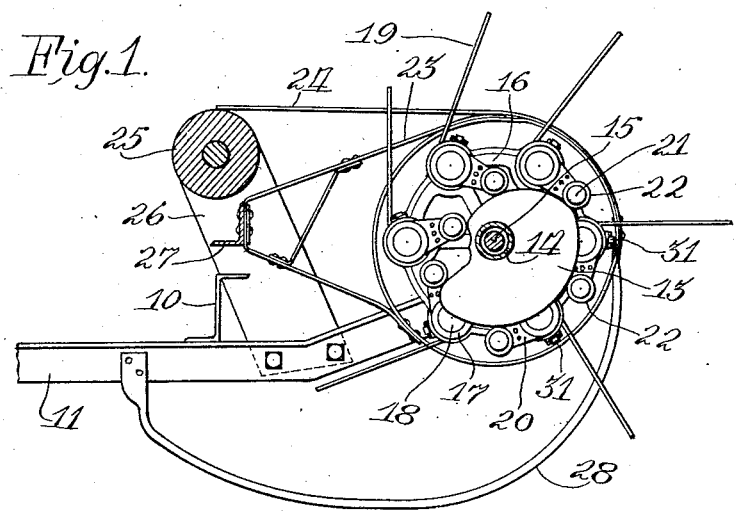
Figure 1 is a side elevational view, partly in section, of the pick-up device attached to a platform frame member of a combine or harvester thresher with the near side of the pick-up and support therefor removed, better to illustrate the parts.
Figure 2:
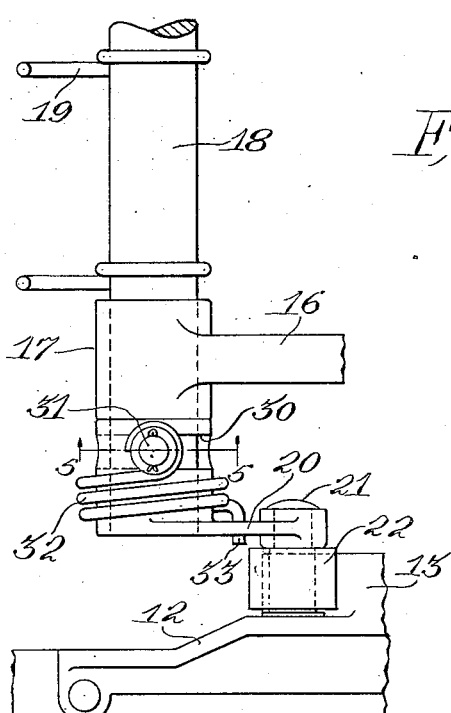
Figure 2 is a plan detail view of an end of one of the rake tooth bars of the pick-up cylinder showing the manner of its association with the cam which causes angling of the bars and teeth during operation of the pick-up.
Figure 4:
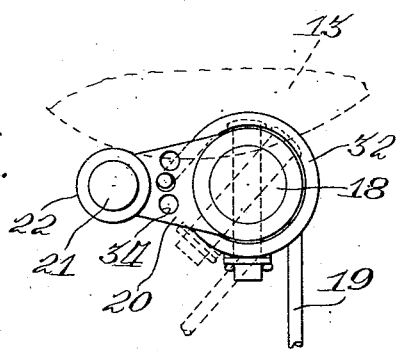
Figure 4 is an end elevational view of one of the rake tooth bars.

The platform of a combine or harvester thresher is generally represented in Figure 1 by the platform Z-bar 10, the under side of the platform, which is not shown, carrying any appropriate number of longitudinally extending angle bar supports 11, which protrude forwardly and upwardly a substantial distance relative to the transverse Z-bar 10. The support 11 on the near side, which is not shown in Figure 1, carries, as indicated in Figure 2, a bracket 12, the front end of which is formed in any suitable manner with a cam 13, said cam being stationary and provided with a bearing 14 for receiving a transversely disposed rake cylinder shaft 15, the back end of said shaft 15, not shown, being supported in an appropriate bracket, as is common practice in these devices. Each end of the shaft 15 carries a spoked wheel 16 to rotate with the shaft 15, and at equidistantly spaced points along the circumference of these wheels 16 are provided bearing sleeves 17, each of which receives rake bars or shafts 18 rockably mounted in the said bearings 17. Mounted on these bars 18 are the usual rake or pick-up teeth 19, which are caused to change their angularity as the rake cylinder turns by means of crank arms 20, one each of which is connected to the rear end of each rake bar or shaft 18. The free end of each crank arm 20 carries a pin 21 extending laterally to carry a roller 22, which rollers roll over the edge of the cam 13 in a well known manner.

The rake teeth 10 pass between cylinder strips 23 and grain deck strips 24, the rear ends of the latter lying loosely on a transverse clearer roller 25 appropriately supported in brackets 26 carried by the supports 11, while the cylinder strips 23 are appropriately connected to a transverse angle bar 27 in any convenient manner supported by the brackets 26. The entire pick-up device is supported on the ground by means of one or more runners 28 in the usual way. The shaft 15 and roller 25 may be driven in any way desired and as the drive forms no part of the invention it has not been illustrated.

It frequently happens in the use of these pick-up devices that the teeth 19 thereof encounter an overload or hit an obstruction in the field, which might not only injure the teeth, but very often distorts or breaks the rake bars 18, seriously affecting the proper operation of the device. This invention, therefore, provides a yieldable release mechanism for each rake bar to cause, under the conditions mentioned, an automatic release of the bar whereby it yields back away from the destructive force mentioned, to save the teeth and bars from injury and breakage. When the obstruction has been passed, means is provided to return the bar with its teeth to normal raking position.

Figure 5:
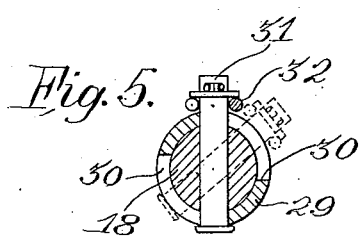
Figure 5 is a cross sectional view through one of the rake tooth bars, as seen along the line 5—5 when looking in the direction of the arrows appearing in Figure 2.
Figure 3:
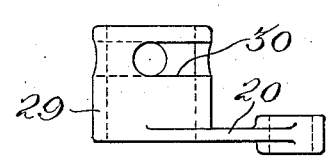
Figure 3 is a plan view of a detail.

As shown in Figure 3, it will be seen that the crank arm 20 is part of a sleeve 29 with one such device slid over the near end of each rake shaft 18. It will also be seen that this sleeve 29 is provided with diagonally opposed cut-out passage-ways 30. A bolt or pin 31 is passed through and fixed in the end of each shaft 18, said pins or bolts 31 passing also through the slots 30. A cushion spring, which here assumes the form of a coil 32, surrounds each sleeve 29, while one end of the coil is hooked around the bolt or pin 31, as shown in Figure 5, and the other end of the spring is extended, as at 33, to be hooked into any one of a series of spaced holes 34 formed through the crank arms 20. Thus, with one end of the coil spring anchored securely to the pin 31, its strength can be varied by the adjustable connection for the other end of the coil spring provided by the holes 34.

In operation, it is apparent now that, if too great strain or pressure is applied to the teeth of any rake bar 18 as it rakes the ground, that bar, independently of the rest, can swing back yieldingly in a rockable fashion against the cushioning action of the springs 32, to prevent damage to the teeth and rake bar for a distance equal to the length of the slots 30. Further, such yielding or rocking of the rake bars 18, when encountering a field obstruction, will be in such a direction that the rollers 22 cannot leave the cam track 13, but will always engage the same.

From this detailed description, it is now apparent that a practicable construction has been disclosed which achieves all of the objects of the invention heretofore recited. It is the intention to cover all such variations as do not materially depart from this invention as indicated by the scope of the appended claims.

What is claimed is:

1. A pick-up comprising a rotary rake cylinder including rockably mounted rake shafts carrying teeth, a cam, a crank arm on each shaft having a roller to engage the cam for changing the angularity of the teeth as the cylinder rotates, strippers cooperating with the teeth, each crank arm having a sleeve formed with opposed slots, a pin in the slots and carried by each shaft, and a spring anchored to the pin and crank arm acting normally to restrain abnormal rocking movement of the rake tooth shafts but permitting temporary abnormal yielding and rocking movement of each shaft when the teeth thereon encounter an obstruction.

2. A pick-up comprising a rotary rake cylinder including rockably mounted rake shafts carrying teeth, a cam, a crank arm on each shaft having a roller to engage the cam for changing the angularity of the teeth as the cylinder rotates, and a spring associated with each crank arm acting normally to restrain abnormal rocking movement of the rake tooth shafts but permitting temporary abnormal yielding and rocking movement of each shaft when the teeth thereon encounter an obstruction.

3. A pick-up comprising a rotary rake cylinder including rockably mounted rake shafts carrying teeth, a cam, a crank arm on each shaft having a roller to engage the cam for changing the angularity of the teeth as the cylinder rotates, strippers cooperating with the teeth, each crank arm having a sleeve formed with opposed slots, a pin in the slots and carried by each shaft, and a spring having opposite ends anchored respectively to the pin and crank arm whereby the rake tooth shafts may be temporarily released for limited yielding movement when the teeth thereof encounter an obstruction.

4. A pick-up comprising a rotary rake cylinder including rockably mounted rake shafts carrying teeth, a cam, a crank arm on each shaft having a roller to engage the cam for changing the angularity of the teeth as the cylinder rotates, each crank arm having a sleeve formed with opposed slots, a pin in the slots and carried by each shaft, and a spring having opposite ends respectively anchored to the pin and crank arm.

5. A pick-up comprising a rotary rake cylinder including rockably mounted rake shafts carrying teeth, a cam, a crank arm on each shaft having a roller to engage the cam for changing the angularity of the teeth as the cylinder rotates, each crank arm having a sleeve formed with opposed slots, a pin in the slots and carried by each shaft, and a coil spring surrounding the sleeve and having its opposite ends anchored respectively to the pin and crank arm.

6. A pick-up comprising a rotary rake cylinder including rockably mounted rake shafts carrying teeth, a cam, a crank arm on each shaft having a roller to engage the cam for changing the angularity of the teeth as the cylinder rotates, each crank arm having a sleeve formed with opposed slots, a pin in the slots and carried by each shaft, and a coil spring surrounding the sleeve and having its opposite ends anchored respectively to the pin and crank arm, and means for regulating the tension of said spring.

In testimony whereof I affix my signature.

BENJAMIN M. HYMAN.